United States Patent [19]

Lask

[11] Patent Number: 5,078,927

[45] Date of Patent: Jan. 7, 1992

[54] PROCESS FOR MAKING RAW MATERIAL BODIES ESPECIALLY FOR THE PRODUCTION OF SILICON OR SILICON ALLOYS

[75] Inventor: Gert-Wilhelm Lask, Berus, Fed. Rep. of Germany

[73] Assignee: Applied Industrial Materials Corporation - AIMCOR, Deerfield, Ill.

[21] Appl. No.: 551,516

[22] Filed: Jul. 11, 1990

[30] Foreign Application Priority Data

Jul. 15, 1989 [DE] Fed. Rep. of Germany ....... 3923446

[51] Int. Cl.$^5$ ............... C01B 31/00; C01B 31/36; C10L 5/16
[52] U.S. Cl. ............... 264/29.3; 44/564; 44/569; 44/591; 44/597; 44/599; 264/117; 264/122; 423/345; 423/349; 423/449
[58] Field of Search ............... 264/29.1, 29.3, 117, 264/122, 125; 423/344, 345, 348, 349, 350, 445, 449; 44/15 R, 16 R, 19, 21, 23, 26, 550, 591, 593, 596, 597, 599, 564, 569

[56] References Cited

U.S. PATENT DOCUMENTS

| 4,364,974 | 12/1982 | Lask | 423/345 X |
| 4,366,137 | 12/1982 | Lask | 423/350 |
| 4,389,493 | 6/1983 | Lask | 264/122 X |
| 4,820,341 | 4/1989 | Lask et al. | 423/350 X |
| 4,908,167 | 3/1990 | Beckmann et al. | 264/29.3 |
| 4,975,226 | 12/1990 | Lask | 264/29.5 |

FOREIGN PATENT DOCUMENTS

| 3009808 | 2/1982 | Fed. Rep. of Germany . |
| 3724541 | 2/1989 | Fed. Rep. of Germany . |
| 2084122 | 3/1984 | United Kingdom . |
| 2150128 | 7/1987 | United Kingdom . |

*Primary Examiner*—Leo B. Tentoni
*Attorney, Agent, or Firm*—Herbert Dubno

[57] ABSTRACT

Raw material bodies such as briquettes, for use in the production of silicon or silicon alloys, are formed by mixing a pitch and caking coal at a temperature above 100° C. and up to 200° C. to form a pitch/coal alloy. This hot binder composition is mixed with sand and a noncaking carbon carrier at a temperature in this range to form the starting composition from which preforms are pressed. The preforms are subjected to a heat treatment which involves raising the temperature to above 450° C., preferably in a sand filled rotary furnace to harden the preforms into the bodies.

11 Claims, 1 Drawing Sheet

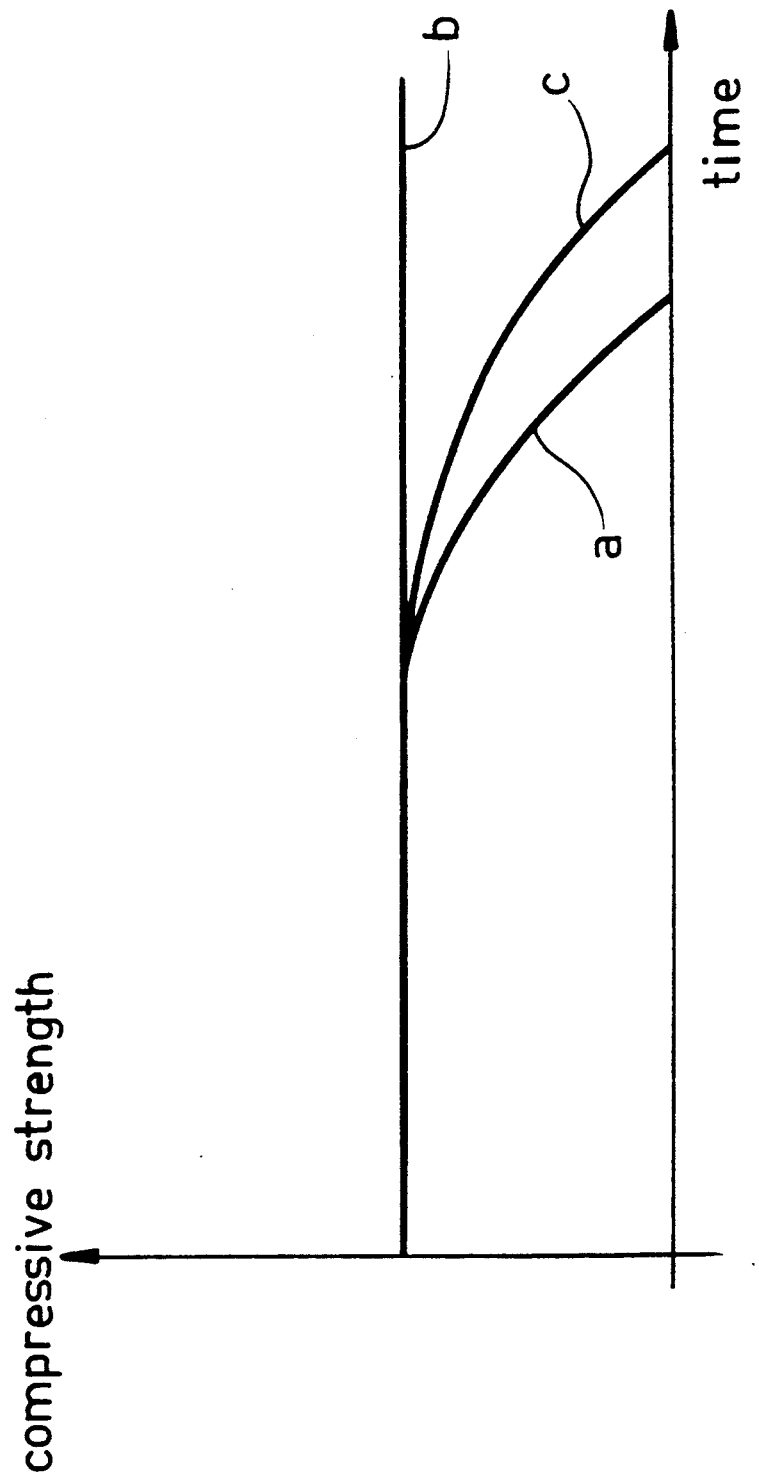

PROCESS FOR MAKING RAW MATERIAL BODIES ESPECIALLY FOR THE PRODUCTION OF SILICON OR SILICON ALLOYS

CROSS REFERENCE TO RELATED APPLICATIONS

This application is related to my copending application Ser. No. 07/551,517 filed July 11, 1990 entitled METHOD OF MAKING FUEL BRIQUETTES AND THE BRIQUETTES SO MADE. It is also related to my copending application Ser. No. 07/220,616 filed July 18, 1988, now U.S. Pat. No. 4,975,226 which, in turn, relates to subject matter found in my earlier U.S. Pat. Nos. 4,389,493, 4,364,974, 4,366,137 and 4,820,341.

FIELD OF THE INVENTION

My present invention relates to a process for producing raw-material bodies for use in the production of silicon or silicon alloys in a low-shaft electric arc furnace, the bodies being generally in the form of briquettes or other pressure-shaped elements The invention also relates to the bodies made.

BACKGROUND OF THE INVENTION

In the production of silicon or silicon alloys in a low-shaft electric arc furnace, it is known, as the discussion below will demonstrate, to utilize raw material bodies, blanks or elements which are composed of quartz sand, a noncaking carbon carrier, preferably petroleum coke, and a pitch-containing binder.

A composition of this type is formed by mixing the quartz sand, the noncaking carbon carrier and the pitch-containing binder and subjecting the mixture to briquetting thereby forming green briquettes or preforms. These briquettes then subjected to a hardening heat treatment to produce the raw material bodies with sufficient structural stability that they will retain integrity over at least part of the silicon or silicon alloy producing process occurring in the low-shaft electric arc furnace.

In the production of such raw material bodies, quartz sand in the particle size or grain range of 0.05 to 0.2 millimeters is usually employed and indeed with various grain-size bands within this range. It will be understood that the raw material bodies for the production of ferrosilicon can also contain finely divided iron or finely divided iron oxide. The iron or the iron oxide can also be added directly to the burden of the low-shaft electric arc furnace, either in the form of pieces or pellets. The burden predominantly consists of the raw material bodies and quartz.

Depending on the specific use to which the raw materials are to be put, they just have certain chemical and physical properties.

Thus for the production of silicon, in chemical terms the raw material bodies must have a composition (see the Great Britain Patent 2 084 122) such that, in their passage through the low-shaft electric arc furnace, in the upper part, they sustain a reaction according to the equation $$SiO_2 + 3c = SiC + 2CO$$

leading toward the formation of silicon carbide. For that purpose, the total carbon content of each individual raw material body must be correspondingly selected. In general, however, a superstoichiometric operation is preferred (see Great Britain Patent 2,150,128). In physical terms the raw material bodies must have sufficient strength and integrity that they will not deteriorate during passage at least through the upper portion of the low-shaft electric arc furnace and especially in the reaction which forms the silicon carbide so that the bodies can reach the lower part of the electric arc furnace where they can react further with the molten quartz in accordance $$SiO_2 + SiC = 3Si + 2CO.$$

It will be understood that in the low-shaft electrode arc furnace further reactions can be carried out. Among these are:

$$SiO_2 + C = SiO + CO$$

which occurs at high furnace temperatures to generate volatile silicon monoxide which can be lost and can have a detrimental effect on the output of the process and the heat balance.

In an earlier process from which the present invention has developed (see German Open Application 37 24 541), the raw material bodies free from caking coal are formed by a binder briquetting. The hardening heat treatment is effected in a heated rotary kiln or rotary tube furnace which has its lower portion so filled with quartz sand that the heat treatment takes place by immersion of the briquettes in the quartz sand bed. This has been found to be highly satisfactory. The hardened raw material bodies are able to withstand all of the stresses arising in the process during the transiting of the low-shaft electrode arc furnace and hence the chemical processes which are carried out are particularly well defined.

However, the bodies do not have satisfactory long term storage capabilities in many respects and as to such long term storage properties, therefore, improvements are possible. For example, the mechanical strength of such bodies decreases with time to the point that the bodies may deteriorate. It has been found that such deterioration may be a result of diffusion of air and moisture into the bodies when they are stored in the open and that such diffusion may reduce the binding force of the binder which is used. This is not the case with raw material bodies for the same purpose which may be fabricated by hot briquetting techniques (see German Patent Document DE-OS 30 09 808), but the hot briquetting process is relatively more expensive.

OBJECTS OF THE INVENTION

It is an object of the invention to provide an improved process for the production of raw material bodies, especially for producing silicon or silicon alloys in low-shaft electric arc furnaces, so that these bodies not only have all of the physical and chemical requirements necessary to satisfy the needs for the process in the travel through the electric arc furnaces, but also have improved long term storage properties, especially for transport and storage in the open without mechanical deterioration.

Another object of the invention is to provide an improved raw material body which can be stored and transported in the open, while being exposed to ambient air and moisture without mechanical deterioration.

SUMMARY OF THE INVENTION

These objects and others which will become apparent hereinafter are attained, in accordance with the invention by a method in which the pitch containing binder is made from a binder mixture of pitch and caking coal and which is brought to a temperature in excess of 100° C. and up to 200° C. The binder is combined with the quartz sand and the noncaking carbon carrier at a mixing temperature which is in the same temperature range as that at which the binder was formed and the blanks or green briquettes are briquetted at this latter mixing temperature, the green briquettes being subjected to a heat treatment such that the briquettes at the final portion of this heat treatment at least have a terminal temperature in excess of 450° C.

In the process of the invention, the briquetting which forms the raw material bodies or preforms is a binder briquetting of the type common in bituminous coal briquetting. Indeed, in spite of the high content preform of quartz sand, the known binder briquetting technology can be used. In general, one operates with conventional briquetting press and press pressures of 1 to 2 t/cm$^2$.

Surprisingly, the use of the aforedescribed binder composition and maintaining the given parameters, yields raw material bodies which satisfy all of the requirements for the low-shaft electric arc process but also has a long term storage capability in the sense that the briquettes can be stored for long periods in the open air and even in the presence of moisture without mechanical degradation. This is especially the case when the binder is formed by a pitch/coal "alloy". A pitch-coal alloy is a composition in which the pitch and the caking coal are mutually soluble and, following the formation of the binder it is practically impossible to discern separate pitch and caking coal phases. This is easily achievable when a sufficiently fine caking coal is used. The pitch/coal alloy in the raw material bodies fabricated according to the invention are surprisingly insensitive to air and moisture diffusing into the briquettes.

Especially effective results are obtained when the quartz sand, the noncaking carbon carrier and the binder mixture all have the same temperature on mixing and the mixing is carried out with a temperature of about 160° C.

While the process of DE-OS 37 24 541 is carried out in a rotary tube furnace for the hardening heat treatment of the bodies, the heat treatment according to the invention can be carried out also in other ways. For example, the process can be a traveling grate process in which the traveling grate passes through a corresponding furnace or a corresponding chamber and the briquettes to be treated are provided in a single layer or a plurality of layers on the travel grate.

In a preferred embodiment of the invention, however, the preforms are hardened in a rotary kiln or rotary tube furnace. It has been found that best results in the heat treatment are obtained and the preforms are hardened to very high final compressive strengths, when the preform has a specific gravity or weight as controlled by the ratio of components of the briquetting mixture and the compaction pressure, which is greater than the piled weight of the quartz sand, i.e. the bulk weight, bulk density or apparent density thereof. Hence, when the preform is introduced into the heated rotary kiln or rotary tube furnace where the latter is sufficiently filled with quartz sand, an immersion bed is formed and the heat treatment is carried out by contact with the hot sand as the preforms are fully surrounded thereby.

The quartz sand has a preferred temperature of 500° to 530° C. at least at the outlet end of the rotary kiln or furnace.

It has been found to be advantageous, moreover, to fill the rotary furnace with quartz sand so that the quartz sand volume is at least equal to twice the pore volume in a loose pile of the preforms in an amount of the latter intended to be treated at one time in the furnace. In general, however, the techniques set out in DE-OS 37 24 541 can be used.

As to the binder itself, with respect to the starting composition adapted to be formed into the briquettes, i.e. the preforms, the binder should include at least 7% by weight of the starting mixture of pitch in the form of coal or crude oil pitch, especially electrode pitch, and at least 12% by weight of fine grained caking coal. Preferably the binder is constituted of 7 to 12% by weight of the aforementioned starting composition of pitch and 12 to 14% by weight of the fine grained caking coal.

The starting mixture can also include, in addition to this binder, 20 to 40% by weight of quartz sand and the balance petroleum coke.

Advantageously, the quartz sand has a particle size of 0.05 to 0.2 millimeters and the petroleum coke has a particle size less than two millimeters and at least 60% below 0.5 millimeters. The caking coal used in the binder may have a particle size of 0.01 to 0.25 millimeters.

The raw material bodies produced in accordance with he invention have been found to be well capable of withstanding long term storage in open air and then used in the low-shaft electrode arc furnace. It is possible to add finely divided mineral substances to the starting mixture or activation purposes which can enable them to tolerate temperatures above 1500° C. The raw material bodies can also be used in cupola furnaces for the production of cast iron and as both silicon and carbon carriers in the latter application.

BRIEF DESCRIPTION OF THE DRAWING

The above and other objects, features and advantages of my invention will become more readily apparent from the following description, reference being made to the accompanying highly diagrammatic drawing the sole FIGURE of which is a graph illustrating the Specific Example.

The graph of the drawing has compressive strength plotted along the ordinate and time plotted along the abscissa for the raw material bodies made by the present invention and the comparative example.

SPECIFIC DESCRIPTION AND EXAMPLE

In a first test (comparative example), raw material bodies for producing silicon or silicon alloys in a low-shaft electrode arc furnace are produced of the following composition:

38% by weight quartz sand of a grain size 0.08 to 0.25 millimeters

50% by weight petroleum coke of a particle size of about 2 millimeters and

12% by weight of electrode pitch. The components are mixed intimately at a temperature of 160° C.

The softening point of the electrode pitch was 90° C. according to Kaines. After termination of mixing, the so-produced starting mixture had a temperature of 145° C. After the mixture cooled to 105° C., it was briquetted in a briquette press into substantially spherical preforms of a diameter of about 2 centimeters with a press pressure of 1.5 t/cm$^2$.

The preforms were heat treated for hardening in a rotary furnace as described in DE-OS 37 24 541. The raw material bodies thus produced had, after storage in open air, a compressive strength curve a with long term storage. Before the fall off in physical properties, the bodies had all of the physical and chemical properties required for the silicon or silicon alloy producing process in the low-shaft electrode arc furnace.

2. In a second test (this invention, best mode), one part by weight of the electrode pitch of Test 1 and 1.8 parts by weight of caking coal, at least 80% of which had a particle size between 0.1 and 0.2 millimeters were heated at 160° C. with melting to form a pitch/coal alloy. 18% by weight of this pitch/coal alloy was substituted for the electrode pitch in Test 1 while all other parameters were retained. The test was repeated under these conditions and the raw material bodies produced. After storage in open air for a prolonged period, no deterioration was observed. The comparative results are shown in curve b of the graph.

3. In a third test, (this invention), Test 2 was reproduced except that the preforms were not hardened in the sand bed in a rotary furnace but rather hardened at the same temperature and for the same time on a traveling grate the long term storage results are shown in curve c.

What is claimed is:

1. A process for producing raw material bodies especially for the production of silicon or a silicon alloy in a low-shaft electrode arc furnace, comprising the steps of:
    (a) mixing pitch and caking coal so that they become mutually soluble, said mixing being at a temperature in the range of in excess of 100° C. and up to 200° C. to form a binder which is a pitch/coal alloy;
    (b) mixing quartz sand and a noncaking carbon carrier with said binder at a temperature in said range to form a starting mixture;
    (c) pressing said starting mixture at a temperature in said range to produce preforms therefrom; and
    (d) hardening said preforms by heating said preforms to a final temperature in excess of 450° C. to produce raw material bodies therefrom.

2. The process defined in claim 1 wherein said noncaking carbon carrier is petroleum coke.

3. The process defined in claim 2 wherein said quartz sand and said noncaking carbon carrier are brought to the same temperature as said binder for the mixing thereof in step (b).

4. The process defined in claim 3 wherein said same temperature is about 160° C.

5. The process defined in claim 1 wherein said preforms are heat treated in a rotary tube furnace to harden said preforms.

6. The process defined in claim 5 wherein said preforms have a specific gravity set by the composition of said starting mixture and the compaction of said mixture to form said preforms which is greater than the bulk density of quartz sand, said preforms being heat treated in said rotary tube furnace filled with a sufficient quantity of said sand to form an immersion bed for said preforms.

7. The process defined in claim 6 wherein said quantity is substantially equal to twice the interstitial volume of a loose pile of said preforms in said furnace.

8. The process defined in claim 1 wherein said binder comprises at least 7% by weight of said starting mixture of pitch in the form of coal or crude oil pitch and at least 12% by weight of said starting mixture of caking coal.

9. The process defined in claim 8 wherein said pitch is electrode pitch.

10. The process defined in claim 9 wherein said starting mixture contains said binder, 20 to 40% by weight of quartz sand, the balance petroleum coke and an optional activator.

11. The process defined in claim 10 wherein said quartz sand has a grain size of 0.05 to 0.2 millimeters and said petroleum coke has a grain size below 2 millimeters with at least 60% having a grain size below 0.5 millimeters.

* * * * *